J. M. SLAUGHTER.
SELF LUBRICATING CAR WHEEL.
APPLICATION FILED SEPT. 11, 1916.
1,226,127.
Patented May 15, 1917.
3 SHEETS—SHEET 2.
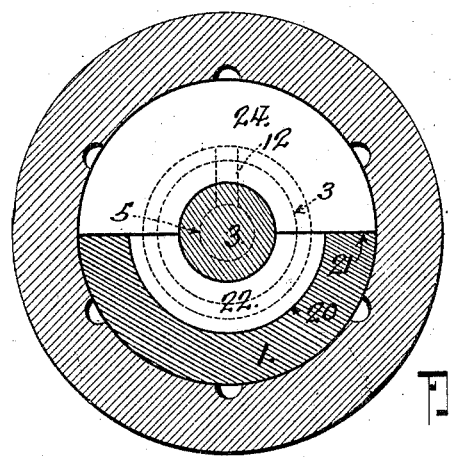
Fig.7.
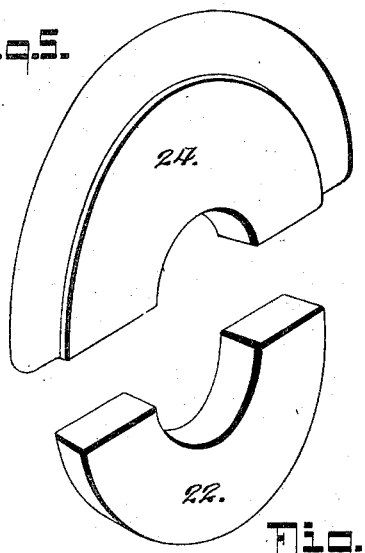
Fig.5.
Fig.6.
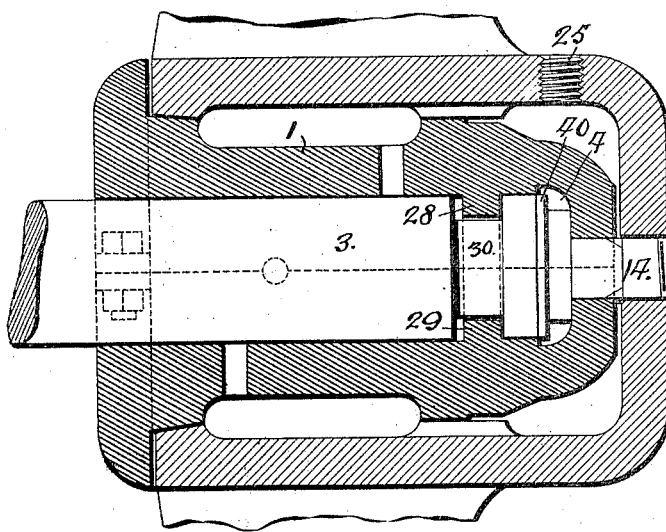
Fig.9.
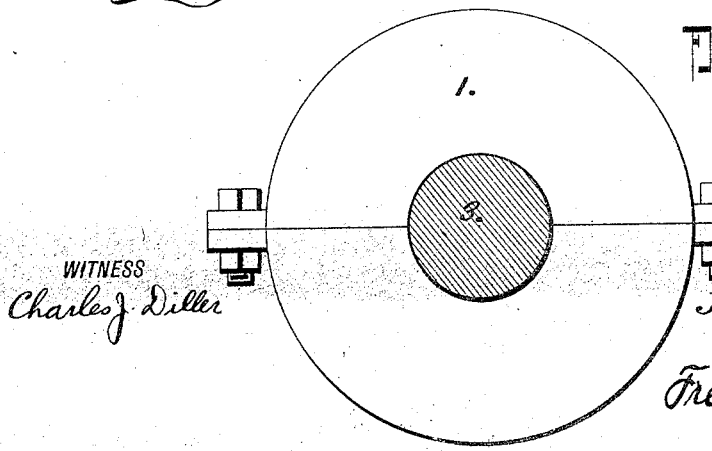
Fig.10.
WITNESS
Charles J. Diller
INVENTOR
J. M. Slaughter.
BY
Fred G. Dieterich
ATTORNEYS

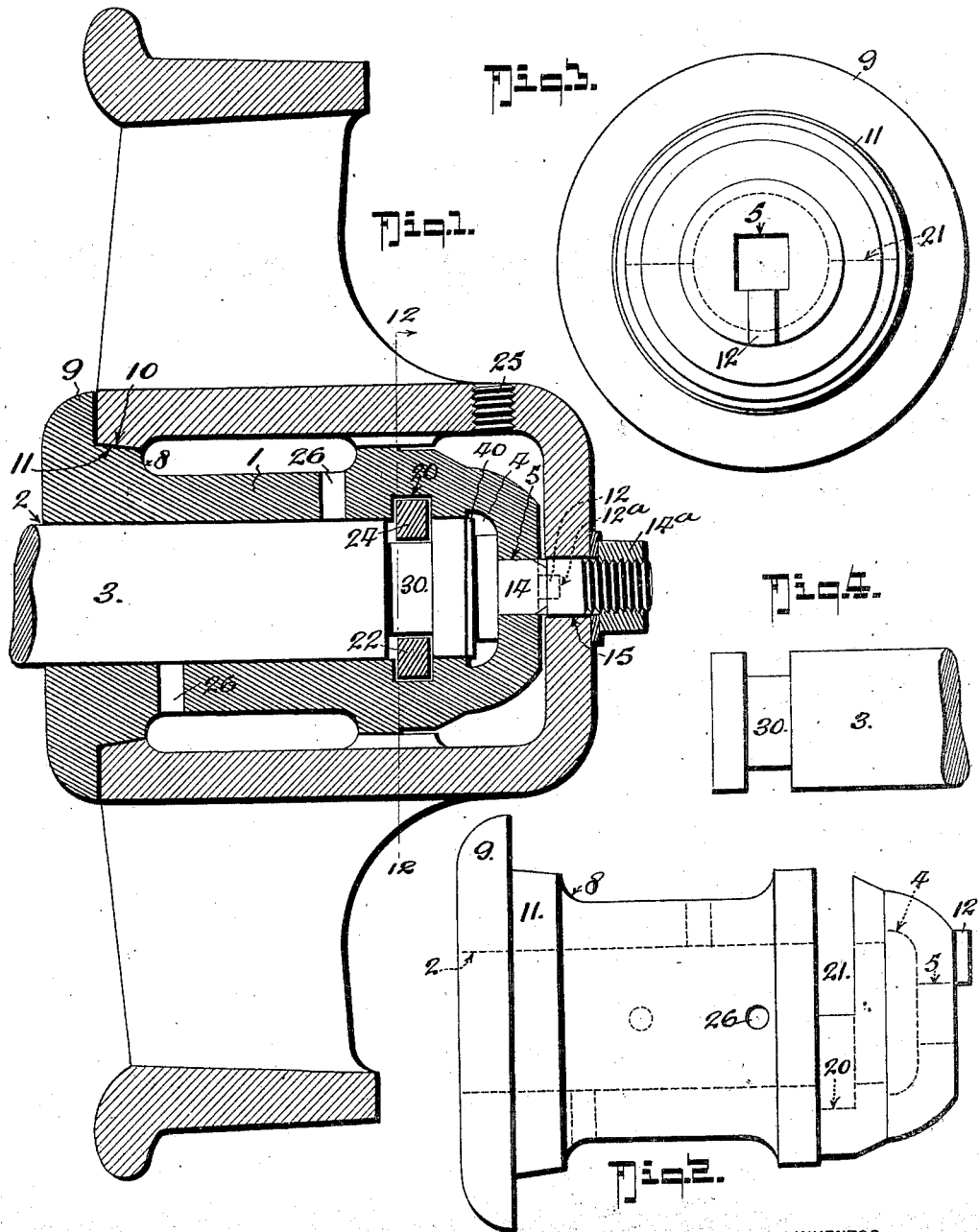

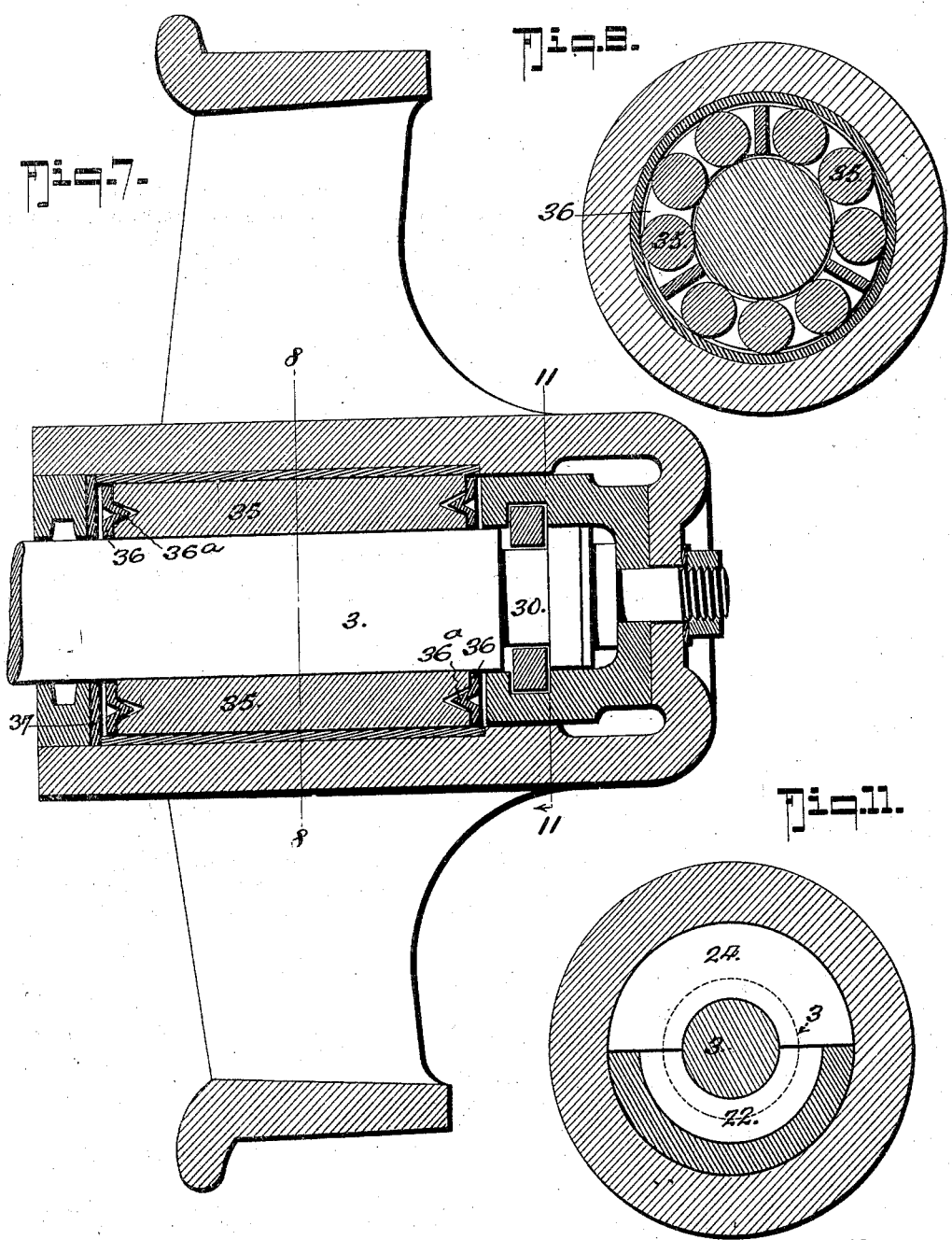

UNITED STATES PATENT OFFICE.

JAMES MONROE SLAUGHTER, OF CHATTANOOGA, TENNESSEE.

SELF-LUBRICATING CAR-WHEEL.

1,226,127.  Specification of Letters Patent.  Patented May 15, 1917.

Application filed September 11, 1916. Serial No. 119,497.

*To all whom it may concern:*

Be it known that I, JAMES M. SLAUGHTER, residing at Chattanooga, in the county of Hamilton and State of Tennessee, have invented certain new and useful Improvements in Self-Lubricating Car-Wheels, of which the following is a specification.

This invention has especial reference to an improved construction of bushing and axle locking means designed for being operatively used in connection with plain bearing car wheels and also adapted for being operatively applied to roller bearing mine or contractors' car wheel.

Primarily, my invention seeks to provide an improved combined bushing and axle locking means for car wheels of a simple, inexpensive and compact nature, in which special provision is provided for protecting the locking means against end thrusts, blows and strains and in which the parts are designed and adapted for being coöperatively connected, quickly applied for use, and in which the bushing is held practically dirt, dust and water proof.

Another object of my invention is to provide an improved bushing and means for interlocking the said bushing with the axle that is so arranged and adapted for being so mounted that the end thrust is taken up at the end of the axle, and the bushing, when worn at the back end, may be easily removed and a new one substituted therefor.

Again, my invention provides, in a combined bushing and coöperating means for locking the bushing onto the axle, an improved arrangement of oil reservoir in the bushing and a peculiar shaping of the rear end of the bushing where it fits into the wheel hub, whereby the oil reservoir is made practically absolutely oil tight and such that the oil can only escape out of the wheel along the axle bore, and thereby lubricate all of the wearing parts.

With other objects in view that will hereinafter appear, my invention embodies the peculiar features of construction and combination of parts set forth in the following description, specifically pointed out in the appended claims and illustrated in the accompanying drawings, in which:

Figure 1 is a horizontal section of a plain bearing car wheel embodying my invention.

Fig. 2 is a side elevation of the bushing.

Fig. 3 is a front end elevation thereof.

Fig. 4 is a side elevation of the grooved end of the axle.

Fig. 5 is a perspective view of the top locking device or key.

Fig. 6 is a similar view of the bottom locking device or key, hereinafter referred to.

Fig. 7 is a horizontal section of a roller bearing car wheel with my improvement applied.

Fig. 8 is a cross section thereof on the line 8—8 on Fig. 7.

Fig. 9 is a section of a plain bearing wheel with a modified construction of bushing and locking means.

Fig. 10 is an end elevation thereof.

Fig. 11 is a cross section on the line 11—11 on Fig. 7.

Fig. 12 is a cross section on the line 12—12 on Fig. 1.

In the preferred form, when applied to a plain bearing car wheel as shown in Fig. 1, the bushing is in the nature of a single body 1, bored as at 2, to receive and fit over the end of the axle 3 and formed at the outer or front end, with an annular chamber or pocket 4 that merges with an axial bore 5 of reduced diameter and which extends through the said outer or front end of the bushing.

The front end of the bushing is tapered and when operatively applied, the said bushing has a limited longitudinal movement on the axle and its tapered flat faced front end engages the rear face of the wheel hub when the end thrust is on the axle as indicated in Fig. 9.

In the preferred form, the bushing 1 is annularly grooved as at 8 to provide an oil space or well between the body portion of the bushing and the wheel hub and at the rear end of the said annular groove 8, the bushing has an enlarged annular shoulder 9 that snugly fits the opening 10 at the rear or back of the wheel hub and the said bushing also has an annular rim 11 that is held practically oil tight against the wheel hub, as shown.

For interlocking the bushing with the wheel hub, the tapered or flat end of the said bushing has at least one lug 12 for engaging a corresponding socket 12ª in the wheel hub, as shown.

14 designates a combined end thrust and tie bolt that passes through the aperture 15 in the inner end of the wheel hub and the projected threaded end of the said bolt receives clamp nut 14ª, as shown.

The head of the bolt 14 fits in the pocket 4 in the bushing adjacent the inner end of the axle, a case hardened steel washer 40 being interposed between the said bolt head and the axle end.

The locking means, which form an essential part of my invention, when of the preferred construction as shown in Figs. 1, 5, 6 and 12 consists in providing the inner end of the axle 3 with an annular groove 30 and a bushing with an annular groove 20 of less width than the axle groove 30. The groove 20 in the bushing extends under the axle and in line with the axle groove 30 and the said bushing is also provided with a transverse socket 21 the full width of the upper part of the body and disposed in annular alinement with the axle groove 30 and the bushing groove 20.

The locking means includes a pair of locking members, including a bottom ring segment 22 adapted for being slipped edgewise into the transverse socket 21, the alining bushing groove 20 and the axle groove 30 and, when thus applied, the said segment 22 gravitates transversely under the groove portion 30 of the axle and into the bottom of the bushing groove 20 and into the position best shown in Fig. 12, and a top ring segment 24 adapted to fill the transverse socket 21 in the bushing and to fit into the axle and the bushing groove, and the said top ring segment 24 is held in position by the inside bore or housing of the wheel and cannot drop out of place until the bushing is entirely removed from the wheel.

25 designates a screw plug aperture in the wheel hub for the oil supply and 26—26 designate fluid passages in the bushing that leads the lubricant to the axle.

Instead of making the locking elements in two sections, an upper and a lower member, and the bushing a single body as in the preferred form heretofore described, the said bushing may be made in two pieces, top and bottom members, as shown in Figs. 9 and 10, and when thus formed, the top and bottom bushing sections have the upper and lower locking segments or keys cast thereon as indicated at 28 and 29.

When applied to a roller bearing car wheel as shown in Figs. 7, 8 and 11, the bushing is located in the front end of the wheel hub, is keyed to the grooved axle and connected to the hub by the thrust bolt, the axle groove being of sufficient width to relieve the locking segments or keys from end thrust or strains.

The roller bearings 35 spaced around the axle, are held in place by end rings 36 and the latter have tapered bearings 36ª for entering tapered sockets in the ends of the rollers and to relieve the said roller bearings of end thrust strains, the rings 36 have a limited play between the bushing at one end and the cast washer 37 that fits the bore at the inner end of the wheel hub.

From the foregoing description taken in connection with the drawings, the complete structure and the coöperation of the parts that constitute my invention will be readily understood.

By reason of providing a bushing such as is shown and described and locking devices for interlockably connecting the said bushing with the axle, the said bushing will prove most advantageous in use because when worn at the back end of hub along the axle bore, the bushing only is discarded and a new bushing which costs only a fraction of the entire wheel is inserted into the wheel housing—thereby producing practically all of the benefits of a new wheel at a small cost compared with the present usage of having to "scrap" the wheels and substitute a new wheel when the axle bore becomes worn.

Another advantage in the use of my special design of bushing is that the same makes its own oil well or reservoir and by tapering the back end of the bushing where it fits into the wheel, the oil well is made absolutely oil tight so that the lubricant can only escape out of the wheel along the axle bore.

What I claim is:

1. In a car wheel, the combination with the axle having a locking groove, a bushing bored to fit over the grooved end of the axle, a locking means independent of the axle and the bushing coöperating with the said axle groove and the said bushing to lock the said bushing to the axle, a car wheel having a tubular hub in which the bushing and axle are received, means for interlockably connecting the bushing and the hub and other means for holding the wheel and hub from endwise displacement over the bushing and axle.

2. In a car wheel, the combination with the axle having a locking groove, a bushing bored to fit over the grooved end of the axle, a locking means coöperating with the said axle groove and the said bushing to lock the said bushing to the axle, a car wheel having a tubular hub in which the bushing and axle are received, means for interlockably connecting the bushing and the hub and other means for holding the wheel and hub from endwise displacement over the bushing and axle, the said bushing and axle having a relative limited longitudinal movement.

3. In a car wheel, the combination with the annularly grooved axle and the wheel hub; of a bushing bored to fit over the end of the axle, locking means coöperating with the bushing and the axle, said axle and bushing having a relatively limited longitudinal movement, and means interposed between the end of the axle and the bushing for transferring the end thrusts on the axle to the bushing and the hub to thereby relieve the locking means from end thrust strains.

4. In a wheel, the combination with the end closed wheel hub and the axle, the said axle having an annular groove in the end that enters the wheel hub; a bushing bored to fit over the grooved end of the axle, a closure member that engages the axle and covers the open end of the hub, the said bushing having a closed end face, means for holding the said end face of the bushing up against the closed end of the hub, locking devices that coöperate with the bushing and the groove in the axle, the said axle having a limited movement relative to the locking devices, whereby to relieve the said devices of end thrust strains, and means interposed between the axle end and the bushing for transferring the axle end thrust to the bushing and the wheel hub.

5. In a wheel, the combination with the end closed wheel hub and the axle, the said axle having an annular groove in the end that enters the wheel hub; a bushing bored to fit over the grooved end of the axle, a closure member that engages the axle and covers the open end of the hub, the said bushing having a closed end face, means for holding the said end face of the bushing up against the closed end of the hub, locking devices that coöperate with the bushing and the groove in the axle, the said axle having a limited movement relative to the locking devices, whereby to relieve the said devices of end thrust strains, and means interposed between the axle end and the bushing for transferring the axle end thrust to the bushing and the wheel hub, the said hub and bushing having relatively annular grooves that form oil wells, the hub having a normally closed inlet for receiving the oil.

6. In a wheel, the combination with an end closed wheel hub, an axle that extends into the hub and having an annular groove near its inner end, a closure member that fits over the axle and closes the open end of the hub, a closed end bushing bored to fit over the groove end of the axle, roller bearings that take around the axle between the end closure and the bushing and engage the hub, said bushing having an annular groove of less width than the axle groove with which it alines, locking devices that engage the axle and the bushing grooves, and means for holding the closed end of the bushing up to the closed end of the hub.

7. In a wheel, the combination with an end closed wheel hub, an axle that extends into the hub and having an annular groove near its inner end, a closure member that fits over the axle and closes the open end of the hub, a closed end bushing bored to fit over the groove end of the axle, roller bearings that take around the axle between the end closure and the bushing and engage the hub, said bushing having an annular groove of less width than the axle groove with which it alines, locking devices that engage the axle and the bushing grooves, and means for holding the closed end of the bushing up to the closed end of the hub, the said bushing having an annular groove that forms an oil well, the aforesaid wheel hub having a normally plugged oil receiving aperture.

8. As an improvement in car wheels, the combination with the wheel hub having a closed outer end and the axle having an annular groove near its end; of a bushing bored to receive the axle and having a tapered inner closed end, means for holding the said end adjacent the closed end of the hub, other means for interlocking the said end to the hub, the said bushing having a segmental groove that alines the bottom portion of the axle groove and a transverse slotway that alines the upper part of the axle groove, the said axle groove being of greater width than the slotway and groove in the bushing, and a bottom key device for coöperating with the axle groove and the segmental groove in the bottom of the bushing and a top key device that coöperates with the transverse slotway in the bushing and the upper axle groove section.

9. In a car wheel, the combination with a wheel having a closed end hub, an axle having an annular groove, a bushing having a closed end, the said bushing being adapted for snugly fitting in the wheel hub with its closed end up to the closed hub end, said hub end and the bushing having interlocking portions, the bushing having an internal annular section and a transverse slotway that merges with the said groove section, means for removably holding the closed end of the bushing against the adjacent hub end, said groove and slotway in the bushing being of less width than the axle groove, the said bushing including a flanged outer end that forms a closure for the open end of the wheel hub, said bushing and the hub being relatively annularly grooved to form oil wells, the hub having a normally closed oil inlet, a key section adapted to be entered through the slotway in the bushing to engage the axle groove and the segmental groove in the bushing and an upper key section adapted to fit the transverse slotway in the bushing and the adjacent portion of the axle groove.

10. In a car wheel, the combination with an annularly grooved axle end, a bushing bored to fit over the said axle end, locking key members engaging said groove and having a relatively fixed connection with the bushing, said key members being of less width than the groove in the axle, a car wheel having a closed end tubular hub in which the bushing and axle are received, means for interlockably connecting the bushing and the hub, said bushing and axle having a relatively limited endwise movement and means interposed between the end of the axle and the bushing for transferring the end thrusts of the axle to the bushing and the hub to thereby relieve the locking key devices from endwise strain.

JAMES MONROE SLAUGHTER.